United States Patent [19]
Schulz et al.

[11] Patent Number: 5,529,538
[45] Date of Patent: Jun. 25, 1996

[54] BOOT BUSHING FOR CONSTANT VELOCITY UNIVERSAL JOINT

[75] Inventors: John F. Schulz, Saginaw; Robert C. Farrell, Frankenmuth; Keith A. Kozlowskik, Saginaw; Richard A. Devers, Saginaw; Donovan J. Zollinger, Saginaw, all of Mich.

[73] Assignee: General Motors Corporation, Detroit, Mich.

[21] Appl. No.: 328,198

[22] Filed: Oct. 24, 1994

Related U.S. Application Data

[63] Continuation of Ser. No. 41,365, Apr. 1, 1993, abandoned.

[51] Int. Cl.⁶ .............................. F16D 3/205; F16D 3/84
[52] U.S. Cl. .................. 464/111; 464/175; 464/905
[58] Field of Search .................................. 464/175, 173, 464/111, 905; 277/212 FB

[56] References Cited

U.S. PATENT DOCUMENTS

| | | | |
|---|---|---|---|
| 3,120,744 | 2/1964 | Dunn | 64/8 |
| 4,083,202 | 4/1978 | Westercamp | 64/32 |
| 4,196,598 | 4/1980 | Hirai et al. | 464/111 |
| 4,320,632 | 3/1982 | Doré | 464/111 |
| 4,516,957 | 5/1985 | Chyz et al. | 464/111 |
| 4,605,384 | 8/1986 | Kurzeja et al. | 464/111 |
| 4,768,990 | 9/1988 | Farrell et al. | 464/111 |
| 4,768,994 | 9/1988 | Stenglein | 464/111 |
| 4,786,270 | 11/1988 | Iwasaki | 464/111 |
| 4,795,404 | 1/1989 | Sutton et al. | 464/905 |
| 5,009,628 | 4/1991 | Rouillot | 464/111 |
| 5,062,821 | 11/1991 | Moulinet | 464/111 |

*Primary Examiner*—Daniel P. Stodola
*Assistant Examiner*—Eileen A. Dunn
*Attorney, Agent, or Firm*—Saul Schwartz

[57] ABSTRACT

A bushing between a big diameter end of a flexible boot and a tulip housing of a constant velocity universal joint. The tulip housing has a plurality of longitudinal drive channels each open at an open end of the tulip housing. Drive bearings on a trunnion on the end of a shaft are bodily shiftable in the drive channels and accommodate stroking and angulation of the shaft relative to the tulip housing. The bushing has an integral boss aligned with the open end of each drive channel. Each boss has a pair of channel segments aligned with planar sides of the drive channel which segments define extensions of the drive channel. The channel extensions receive the drive bearings if the bearings become dislodged from their drive channels during installation of the universal joint on a vehicle. The channel extensions maintain the alignment of the dislodged drive bearings relative to the open ends of the drive channels so that the boot does not need to be unclamped to effect reentry of the drive bearings into the drive channels.

3 Claims, 2 Drawing Sheets

BOOT BUSHING FOR CONSTANT VELOCITY UNIVERSAL JOINT

This is a continuation of application Ser. No. 08/041,365 filed on Apr. 1, 1993, now abandoned.

FIELD OF THE INVENTION

This invention relates to stroking constant velocity universal joints in motor vehicle front wheel drive axles.

BACKGROUND OF THE INVENTION

Stroking constant velocity universal joints in motor vehicle front wheel drive axles typically include a cup-shaped tulip housing connected to a differential side gear, a shaft connected to a driven wheel, a hub on the shaft with radial trunnions extending into longitudinal drive channels in the tulip housing, and drive bearings between the trunnions and the drive channels which accommodate stroking and angulation of the shaft relative to the tulip housing. U.S. Pat. No. 4,768,994, issued 6 Sep. 1988 and assigned to the assignee of this invention, describes a representative stroking constant velocity universal joint. A boot is clamped to the shaft and to the tulip housing to prevent contamination of the joint and to retain within the housing a quantity of lubricant and an elastomeric bushing around the tulip housing forms a cylindrical seat for the boot. Occasionally, during installation on a vehicle, a drive bearing may become dislodged from the open end of its drive channel. In that circumstance, the orientation of the bearing relative to the drive channel is usually disturbed so that the boot must be unclamped and the bearing realigned before installation can proceed, a time consuming undertaking. A boot bushing according to this invention prevents misalignment between the drive bearing and its corresponding drive channel when the drive bearing becomes dislodged.

SUMMARY OF THE INVENTION

This invention is a new and improved boot bushing in a stroking constant velocity universal joint of the type having a tulip housing, a shaft, a hub on the shaft with a plurality of radial trunnions extending into respective ones of a corresponding plurality of open-ended longitudinal drive channels in the tulip housing, drive bearings between the trunnions and the drive channels which accommodate stroking and angulation of the shaft relative to the tulip housing, and a flexible boot having a small end clamped to the shaft and a big end around an open end of the tulip housing. The bushing according to this invention is a molded, one-piece elastomeric element of generally annular configuration having a cylindrical outside surface and an inside surface which conforms to the shape of the tulip housing so that the bushing fits snugly over the open end of the housing. The outside surface of the bushing defines a seat for the flexible boot. The bushing has a plurality of raised bosses aligned with the open ends of respective ones of the drive channels in the tulip housing. Each boss defines a channel segment adjacent the open end of and defining an extension of the corresponding drive channel. If a drive bearing becomes dislodged from the open end of its drive channel, the corresponding channel segment maintains the orientation of the loose drive bearing so that it is not necessary to unclamp the big end of the boot to effect reentry of the drive bearing into its drive channel.

DESCRIPTION OF A PREFERRED EMBODIMENT

Figure 1:
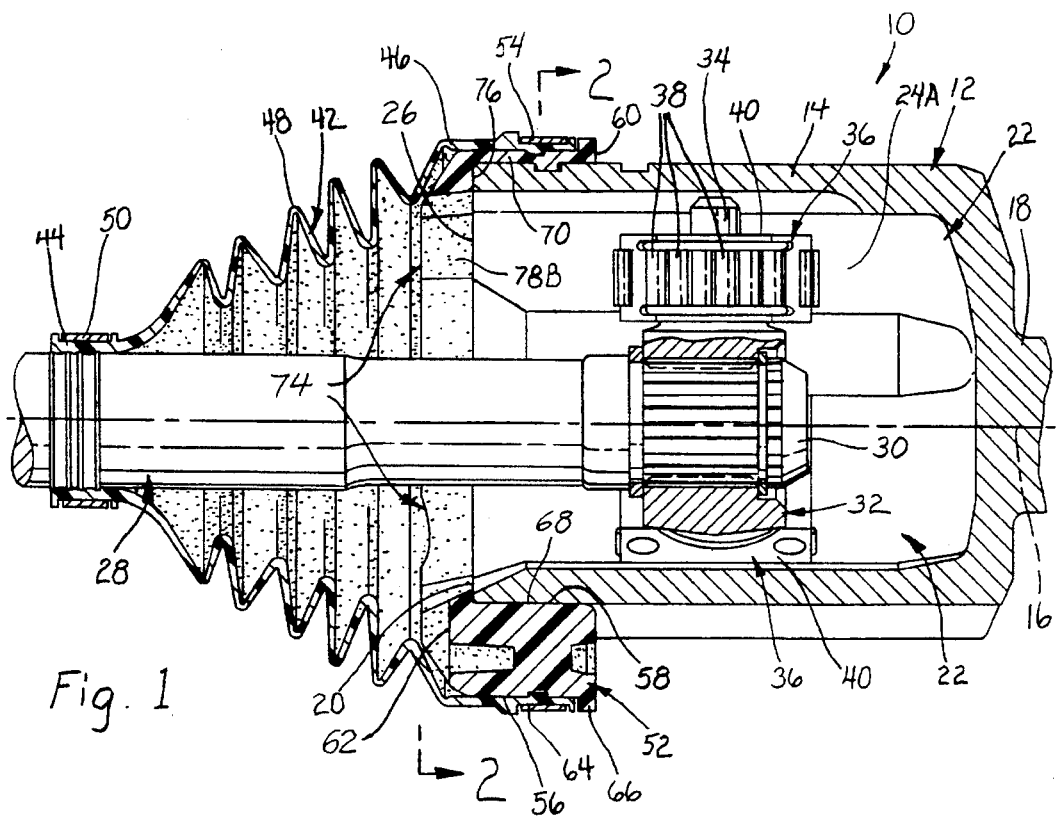
FIG. 1 is a longitudinal sectional view of a stroking constant velocity universal joint having a boot bushing according to this invention.
Figure 2:
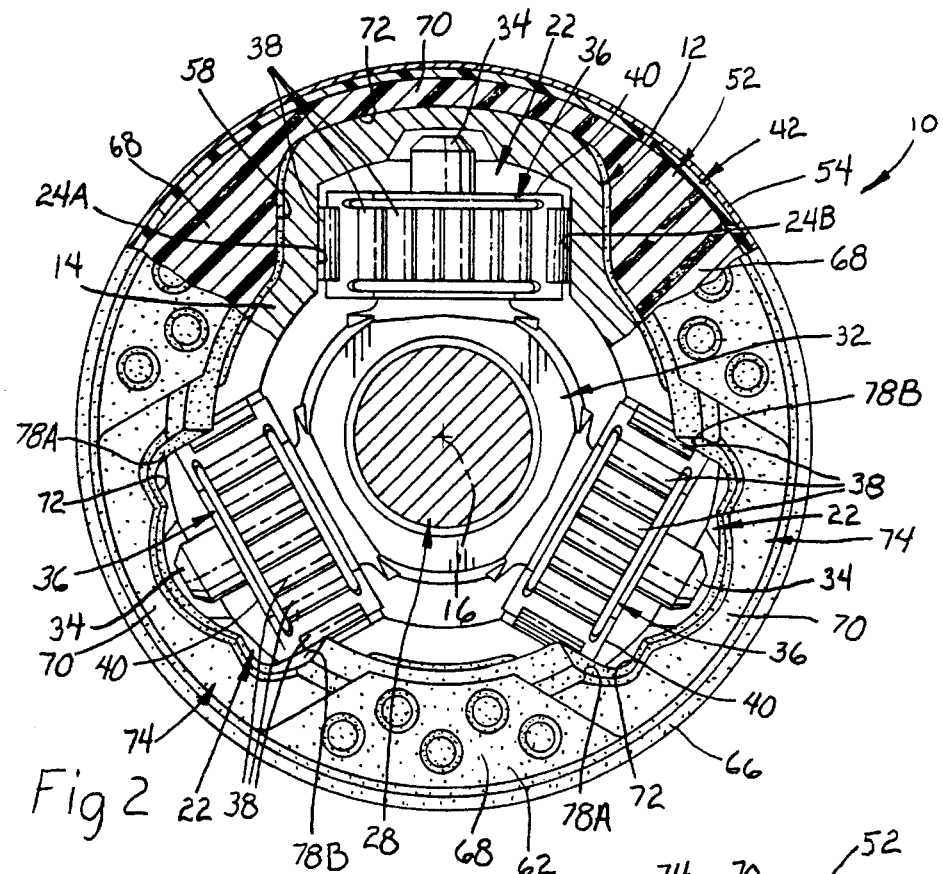
FIG. 2 is a sectional view taken along the plane indicated by lines 2—2 in FIG. 1.
Figure 4:
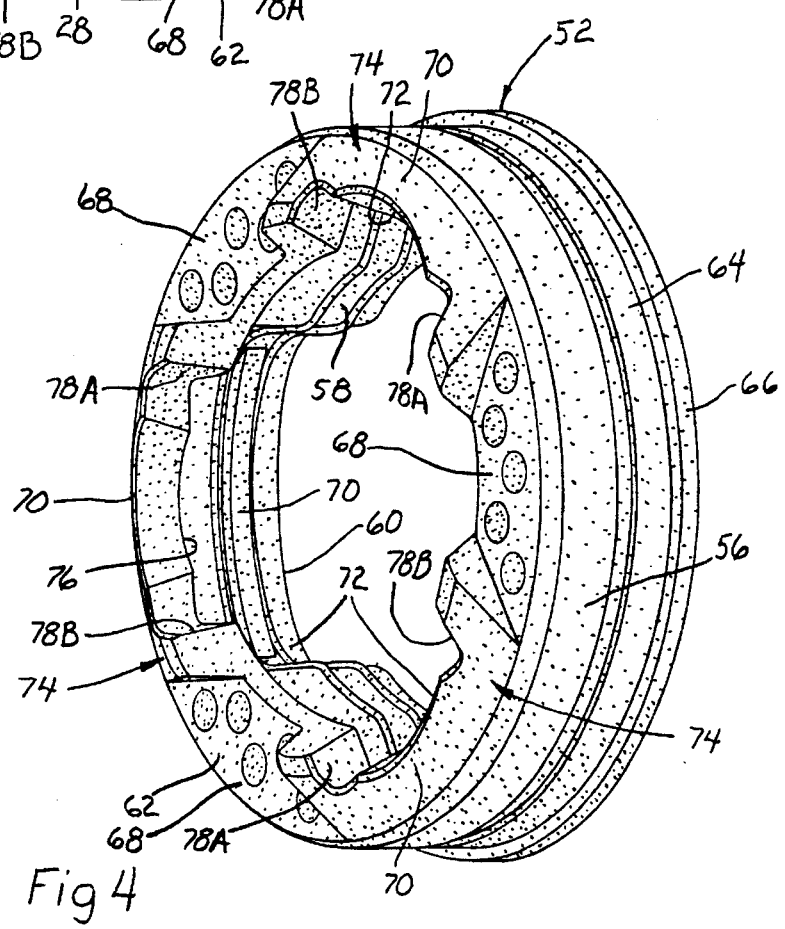
FIG. 4 is a perspective view of a boot bushing according to this invention.

Referring to FIGS. 1, 2 and 4, a stroking constant velocity universal joint 10 includes a tulip housing 12 having a cup-shaped wall 14 symmetric about a longitudinal centerline 16 of the housing. A stem 18 of the housing 12, integral with the wall 14, is aligned on the centerline 16. The stem 18 is adapted for plug-in connection to a side gear, not shown, of a differential gear set of a motor vehicle transmission. The wall 14 has an open end 20 in a plane perpendicular to the centerline 16 and a plurality of longitudinal lobes which define, internally of the housing, a plurality of drive channels 22 spaced at substantially 120 degrees from each other. Each drive channel opens toward the centerline 16 and includes a pair of parallel, radially extending planar surfaces 24A–B which surfaces are also parallel to the centerline 16 of the housing. In addition, each drive channel 22 has an open end 26 in the plane of the open end 20 of the wall 14.

The universal joint 10 further includes a shaft 28 having a hub end 30 disposed inside the tulip housing. A hub 32 is drive connected by splines to the hub end 30 of the shaft 28 and has a plurality of trunnions 34 extending radially into respective ones of the drive channels 22. A S-plan drive bearing 36 is pivotally mounted on each of the trunnions 34 whereby the shaft 28 is connected to the tulip housing 12 for rotation as unit therewith and for longitudinal stroking and angulation relative thereto in well known fashion. U.S. Pat. No. 4,768,990, issued 6 Sep. 1988 and assigned to the assignee of this invention, describes a representative stroking constant velocity universal joint having S-plan drive bearings.

Each drive bearing 36 includes, generally, a square block pivotally connected to a trunnion 34, a plurality of needle bearings 38, and a sheet metal cage 40 around the block. In the direction parallel to the centerline 16, the needles are disposed between the block and the planar surfaces 24A–B of a drive channel 22. The needles in those locations accommodate stroking and angulation of the shaft 28 relative to the tulip housing 12 while transferring torque therebetween. The needles out of contact with the planar surfaces 24A–B traverse the distance between the planar surfaces in a recirculation path defined by the cage 40.

A flexible boot 42 of the universal joint 10 has a small diameter end 44, a big diameter end 46, and a body portion 48 between the ends. The body portion 48 has a plurality of annular convolutions or accordion folds which accommodate stoking and angulation of the shaft 28 relative to the tulip housing 12. The small diameter end 44 is attached to the shaft 28 by a clamp 50. A boot bushing 52 according to this invention is disposed around the tulip housing 12 adjacent the open end 20 of the wall 14 and defines, in usual fashion, a cylindrical seat for the big diameter end 46 of the boot 42. The big diameter end of the boot and the bushing 52 are secured to the tulip housing 12 by a clamp 54.

The boot bushing 52 is molded in one-piece from suitable elastomeric material, such as thermoplastic elastomer commercially available under the tradename SANTOPRENE 101-64. As seen best in FIGS. 1 and 4, the bushing 52 is generally annular in shape and includes a cylindrical outside surface 56, an undulating inside surface 58, a front face 60, and a back face 62. The diameter of the outside surface 56 corresponds to the diameter of the big diameter end 46 of the boot 42 and includes a seating groove 64 and an annular lip 66. Because of the undulating shape of the inside surface 58, the bushing 52 has a plurality of thick filler portions 68 and a plurality of thin bridge portions 70 between the filler portions.

Each pair of facing sides of the filler portions 68 and the interconnecting one of the bridge portions 70 cooperate in defining a plurality of longitudinal channels 72 in the bushing 52. Each longitudinal channel 72 is open in the plane of the front face 60 of the bushing for receiving one of the lobes of the tulip housing. The bushing further includes a plurality of integral raised bosses 74 which project beyond the plane of the back face 62 of the bushing. Each boss 74 is aligned with one of the longitudinal channels 72 in the bushing and includes an abutment face 76 and a pair of planar channel segments 78A–B aligned with the planar sides 24A–B of the corresponding drive channel 22 and defining an extension of thereof.

The bushing 52 is assembled over the open end 20 of the tulip housing 12 and advanced in the direction of the longitudinal centerline 16 to a seated position characterized by engagement of the open ends 26 of the drive channels 22 on the abutment faces 76 of the bosses 74. The lip 66 on the bushing 52 facilitates assembly on the tulip housing and the groove 64 in the outside surface 56 of the bushing defines a seat for the big diameter end 46 of the boot. The filler portions 68 of the bushing reinforce the outside surface 56 between the lobes of the tulip housing so that a lubricant tight seal is effected by the clamp 54 around the big diameter end of the boot.

Figure 3:
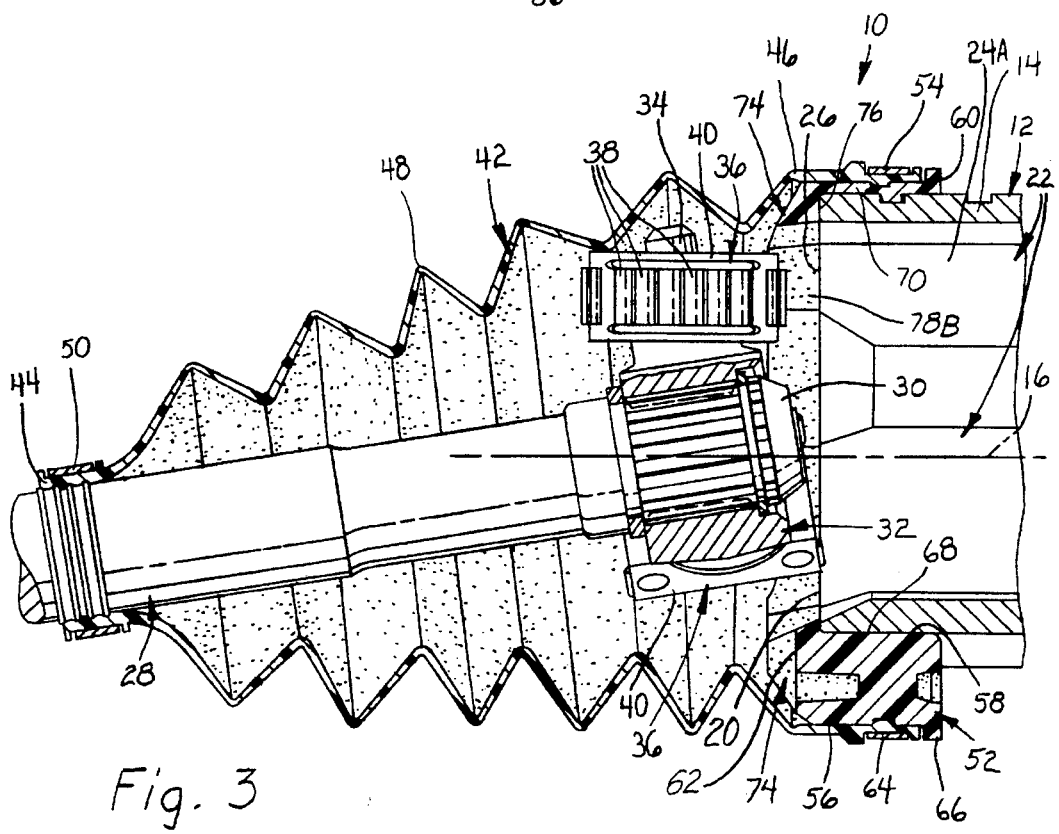
FIG. 3 is similar to FIG. 1 but showing a drive bearing of the stroking constant velocity universal joint loose from its drive channel.

During installation of a drive axle on a vehicle, it is not unusual for one of the drive bearings 36 to become dislodged from the open end 26 of its drive channel 22, as depicted in FIG. 3. In that circumstance, the channel segments 78A–B on the boss 74 aligned with the drive channel 22 from which the drive bearing became dislodged maintain the orientation of that drive bearing relative to the planar sides 24A–B of the drive channel. When the shaft 28 is thereafter stroked and/or angulated in the direction corresponding to reentry of the loose drive bearing into its drive channel, the drive bearing 36 simply reenters the open end 26 of the drive channel 22. The bushing 52 according to this invention renders it is unnecessary to unclamp the big diameter end 46 of the boot, as was heretofore necessary, in order to effect reentry of the loose drive bearing into its drive channel.

The embodiments of the invention in which an exclusive property or privilege is claimed are defined as follows:

1. A stroking constant velocity universal joint comprising:
    a tulip housing having an open end in a plane perpendicular to a longitudinal centerline of said tulip housing,
    a plurality of drive channels in said tulip housing each open through said plane of said open end of said tulip housing and including a pair of planar surfaces parallel to said longitudinal centerline,
    a shaft having a hub in said tulip housing with a plurality of trunnions on said hub extending into respective ones of said drive channels,
    a plurality of drive bearings in respective ones of said drive channels each including a square block having a pair of planar sides on opposite sides of said square block parallel to said pair of planar surfaces of said drive channel and a plurality of needle rollers between said planar sides of said square block and said planar surfaces of said drive channel and a cage defining a continuous path for said needle rollers around said square block,
    means pivotally connecting each of said square blocks to a corresponding one of said trunnions,
    a flexible boot having a small diameter end around said shaft and a big diameter end around said open end of said tulip housing, and
    a boot bushing including
    a unitary elastomeric annulus around said tulip housing adjacent said open end thereof having a planar back face generally in said plane of said open end of said tulip housing,
    said elastomeric annulus having a cylindrical outside surface corresponding in diameter to the diameter of said big diameter end of said boot and an inside surface corresponding in shape to the shape of said tulip housing so that said booth bushing defines a seat for said big diameter end of said boot,
    a plurality of integral bosses on said elastomeric annulus projecting beyond said plane of said back face away from said open end of said tulip housing aligned with respective ones of said drive channels, and
    a pair of planar walls on each of said integral bosses forming extensions of said planar surfaces of said aligned one of said drive channels upon which said needle rollers of the corresponding one of said drive bearings roll to maintain alignment of said planar sides of said square block of said corresponding drive bearing with said planar surfaces of said aligned one of said drive channels when the center of said corresponding one of said drive bearings is outboard of said plane of said open end of said tulip housing.

2. The stroking constant velocity universal joint recited in claim 1 further including:
    an abutment face on each of said integral bosses generally in the plane of said back face of said elastomeric annulus engageable on said open end of said tulip housing to define a seated position of said boot bushing on said tulip housing.

3. The stroking constant velocity universal joint recited in claim 2 wherein:
    said tulip housing has a lobe outside of each of said drive channels so that the outside of said tulip housing is an undulating surface, and
    said elastomeric annulus has a plurality of filler portions separated by a corresponding plurality of integral bridge portions cooperating with said filler portions in defining a plurality of channels in said elastomeric annulus each receiving one of said lobes on said tulip housing.

\* \* \* \* \*